US007778979B2

(12) United States Patent
Hätönen et al.

(10) Patent No.: US 7,778,979 B2
(45) Date of Patent: Aug. 17, 2010

(54) METHOD AND APPARATUS FOR COMPRESSING LOG RECORD INFORMATION

(75) Inventors: Kimmo Hätönen, Helsinki (FI); Markus Miettinen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 113 days.

(21) Appl. No.: 10/507,907

(22) PCT Filed: Mar. 26, 2002

(86) PCT No.: PCT/IB02/00935

§ 371 (c)(1),
(2), (4) Date: Sep. 16, 2004

(87) PCT Pub. No.: WO03/081433

PCT Pub. Date: Oct. 2, 2003

(65) Prior Publication Data

US 2005/0138483 A1    Jun. 23, 2005

(51) Int. Cl.
*G06F 7/00* (2006.01)
(52) U.S. Cl. .................... 707/693; 707/664
(58) Field of Classification Search ................ 707/101, 707/6, 204, 202, 100, 200, 203, 8, 201, 104.1, 707/2, 609, 648, 662, 664, 665, 672, 603, 707/692, 693, 694, 821; 709/223, 224; 706/45, 706/46, 47, 48, 52
See application file for complete search history.

(56) References Cited

U.S. PATENT DOCUMENTS

| | | | | |
|---|---|---|---|---|
| 5,226,153 A | | 7/1993 | DeAngelis et al. ............ 714/45 |
| 5,675,510 A | | 10/1997 | Coffey et al. ............... 709/224 |
| 5,761,676 A | * | 6/1998 | Wood et al. ................. 707/202 |
| 5,764,974 A | * | 6/1998 | Walster et al. ................ 707/6 |
| 5,892,917 A | * | 4/1999 | Myerson ..................... 709/224 |
| 6,092,065 A | * | 7/2000 | Floratos et al. ............... 707/6 |
| 6,125,393 A | * | 9/2000 | Clark et al. ................. 709/224 |
| 6,192,365 B1 | * | 2/2001 | Draper et al. ............... 707/101 |

(Continued)

FOREIGN PATENT DOCUMENTS

EP    0 325 777 A2    8/1989

OTHER PUBLICATIONS

Kieffer et al., Universal Lossless Compression Via Multilevel Pattern Matching, Information Theory, IEEE Transactions on, vol. 46, Issue 4, Jul. 2000, pp. 1227-1245.*

*Primary Examiner*—Greta L Robinson
(74) *Attorney, Agent, or Firm*—Squire, Sanders & Dempsey, LLP (57) ABSTRACT

The present invention relates to a method and apparatus for compressing a log record information provided e.g. to a monitoring system. Frequent patterns in the log information are detected and, then, redundant frequent patterns whose value or record combination is a subset of a value or record combination of another one of said detected frequent patterns are removed. Accordingly, a general method is provided which can be applied to all event logs arising from communication networks or other monitoring systems. The detection of frequent patterns is only based on value or record combinations and is thus independent of the specific application. On the other hand, the size of the stored log files can be decreased remarkably while remaining readable for human beings.

29 Claims, 7 Drawing Sheets

U.S. PATENT DOCUMENTS

| | | | |
|---|---|---|---|
| 6,226,628 B1 * | 5/2001 | Forbes | 707/1 |
| 6,473,757 B1 * | 10/2002 | Garofalakis et al. | 707/6 |
| 6,539,389 B1 * | 3/2003 | Geiner et al. | 707/101 |
| 6,618,725 B1 * | 9/2003 | Fukuda et al. | 707/6 |
| 2002/0174083 A1 * | 11/2002 | Hellerstein et al. | 706/48 |
| 2003/0005107 A1 * | 1/2003 | Dulberg et al. | 709/223 |

* cited by examiner

```
74775;11May2000; 0:00:06;eth-s1p2c0;host.domain.net;log;accept;mdbs_daemon;a-123;123.234. 123.234;tcp;;;;;;;;;;
74776;11May2000; 0:00:15;eth-s1p2c0;host.domain.net;log;accept;mdbs_daemon;a-123;123.234. 123.234;tcp;;;;;;;;;;
74777;11May2000; 0:00:23;eth-s1p2c0;host.domain.net;log;accept;mdbs_daemon;a-123;123.234. 123.234;tcp;;;;;;;;;;
74778;11May2000; 0:00:31;eth-s1p2c0;host.domain.net;log;accept;mdbs_daemon;a-123;123.234. 123.234;tcp;;;;;;;;;;
74779;11May2000; 0:00:32;eth-s1p2c0;host.domain.net;log;accept;3210;a-123;255.255. 255.255;udp;;;;;;;;;;
74780;11May2000; 0:00:38;eth-s1p2c0;host.domain.net;log;accept;3210;a-234;255.255.255.255;udp;;;;;;;;;;
74781;11May2000; 0:00:43;eth-s1p2co;host.domain.net;log;accept;mdbs-daemon;a-123;123.234. 123.234;tcp;;;;;;;;;;
74782;11May2000; 0:00:51;eth-s1p2c0;host.domain.net;log;accept;mdbs_daemon;a-123;123.234. 123.234;tcp;;;;;;;;;;
74783;11May2000; 0:01:00;eth-s1p2c0;host.domain.net;log;accept;mdbs_daemon;a-123;123.234. 123.234;tcp;;;;;;;;;;
74784;11May2000; 0:01:08;eth-s1p2c0;host.domain.net;log;accept;mdbs_daemom;a-123;123.234. 123.234;tcp;;;;;;;;;;
```

| Action | Destination | Info | Interface | Protocol | Rule | S_port | Service | Source | Type | Count | Lines |
|---|---|---|---|---|---|---|---|---|---|---|---|
| Accept | * | | eth-s1p2c0 | tcp | | | mdbs_daemon | a-123 | log | 11161 | Lines |
| Accept | 255.255.255.255 | | eth-s1p2c0 | udp | | | 54321 | * | log | 1437 | Lines |
| Accept | 234.123.234.123 | | eth-s1p2c0 | udp | | | netbios-dgm | * | log | 1607 | Lines |
| Accept | 123.0.0.1 | | eth-s1p2c0 | igmp | | | 23456 | Core | log | 681 | Lines |
| Accept | 234.123.234.123 | | eth-s1p2c0 | udp | | | netbios-ns | * | log | 480 | Lines |
| Accept | * | len 11 | eth-s1p1c0 | udp | 3 | 32101 | 12345 | * | alert | 59 | Lines |
| Accept | * | len 22 | eth-s1p2c0 | tcp | 2 | * | http | a-222 | log | 25 | Lines |
| Accept | * | len 33 | eth-s1p2c0 | tcp | 2 | * | http | a-111 | log | 23 | Lines |
| Accept | * | len 33 | eth-s1p2c0 | tcp | 2 | * | http | a-234 | log | 32 | Lines |
| Accept | * | | eth-s1p2c0 | icmp | | | | * | log | 27 | Lines |
| Accept | 234.123.234.123 | | eth-s1p2c0 | udp | | | 1604 | a-123 | log | 24 | Lines |

```
<fields>
f1;f2;f3;f4
</fields>
<patterns>
<DEFINE CONSTANT>* * * D
<DEFINE p0>A B C
</patterns>
<data>
<unmatched data>
3 A E F
5 X Y Z
</unmatched data>
<pattern data>
<p0>
0,3
4
</p0>
</pattern data>
<data>
```

Fig. 10

```
f1;f2;f3;f4
<DEFINE CONSTANT>* * * D
<DEFINE p0>A B C
3 A E F
5 X Y Z
<p0>
0,3
4
```

Fig. 11

```
f1 f2 f3 f4
<DEFINE CONSTANT>* * * D
<DEFINE p0>A B C
<p0>
<p0>
<p0>
A E F
<p0>
X Y Z
```

Fig. 12

METHOD AND APPARATUS FOR COMPRESSING LOG RECORD INFORMATION

FIELD OF THE INVENTION

The present invention relates to a method and apparatus for compressing log or other information which may be provided to a monitoring system used for monitoring and analysis of communication networks, or to any other system which requires such log information.

BACKGROUND OF THE INVENTION

One of the most challenging problems in data manipulation in the future is to be able to efficiently handle very large amounts of data but also multiple induced properties or generalizations in that data. Monitoring and analysis of communication networks are more and more based on not only event counters and key performance indicators derived from them but also on event logs continuously collected by the monitoring system. For example, security analysis is almost entirely based on such event logs, either by sampling and summarizing them or by analysing detailed logs in order to find out courses of actions that lead to security breaches.

However, such logs may easily grow to an overwhelming data amount. The reason for this is that the monitoring system has to log lots of information to provide the opportunity of analysing afterwards any kind of incidences. This problem becomes worse every day due to the fact that network operators add new and more powerful tools for logging and security monitoring. In most of these tools, data are stored in the form of event logs.

In conventional $2^{nd}$ generation mobile communication networks, event logs may consist of alarms, disturbances and notifications, real time traffic (RTT) reports generated by e.g. a mobile switching center (MSC), billing tickets, performance logs generated by a network management system (NMS) and network elements, operating system logs, and the like. The network operators are starting to utilize information hidden in these logs. The utilization of such log or log record information becomes more and more important in view of the fact that network operators wish to analyse not only behaviour of network elements but also quality of service provided from the network to the customers or customer groups. Moreover, network operators are more and more interested in analysing their own processes and operation of their networks.

In order to achieve proper monitoring and prevent problems as well as security breaches, maintenance staff should analyse these logs regularly and pay attention to any abnormal log entries or early signs of troubles. In practice, however, this is laborious. Logs are so huge—at worst millions of lines per day—and filled with lots of uninteresting entries which makes it difficult to recognize interesting lines in between.

Figure 1:
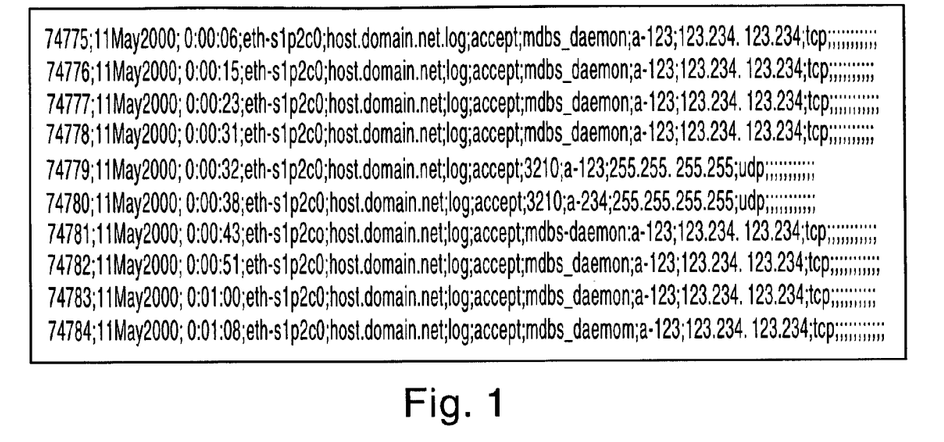
FIG. 1 shows an example of a firewall log portion.

FIG. 1 shows an example of an extract portion of a log record produced by a fire-wall application. Most of the lines are reporting from quite normal network activity which is not very interesting. Therefore, logs are used basically for 'after-the-fact'-analysis where-reasons and chains of events preceding problems are analysed. Even for such tasks, the present logs are very difficult to use due to the huge amount of data which hides relevant facts.

The problem is not only associated with the size of the logs but also the amount of them. Currently, in Network Management systems tens of different types of log files are generated per day, which should be analysed in the course of trouble shooting or security monitoring. For example, event logs from network element operating systems (Unix, NT, etc.), system logs (NMS system, etc.), network monitoring logs (alarms, RTT logs, billing logs, etc.), system operation logs (MML, Unix accounting, connections to network elements, etc.), security logs (intrusion detection systems, authentication, firewalls, etc.) and so on. In addition thereto, new tools and new logs are introduced gradually. The analysis of these huge amounts of logs becomes even harder as there is no common structure or template for these logs. The logs contain lots of semi-structured data meant to be readable and informative for experts in order to debug or follow up the system behaviour. There are, however, also plenty of structured data where field values describe the event as well as time and origin where it occurred. Even a common naming of fields can be provided but unfortunately the meaning of the fields varies from one application to another.

So far, the main solutions presented have been sorted and string based searches for events. In many applications, it is also possible to select some field value combinations either searched for or removed from a display. Furthermore, in alarm correlation, there is rule-based approach where predefined alarm sets or patterns are either suppressed from or combined in display. In intrusion detection applications, systems can be arranged to count combination of values of predefined log fields. When a preset threshold is exceeded, an alarm is signaled. However, these systems are powerless with regard to actions like distributed attacks originated from many sites slowly during longer periods of time.

Another problem arises from the storage requirements of these huge amounts of logs. Due to several reasons these event logs have to be stored for longer periods of time. Security related logs, for example, might be needed several months or even years after their creation in order to properly analyse security breaches which have been taking place during a long period of time or a long time ago. In practice, however, this is difficult since the log files are so huge, at worst millions of lines per day. Archiving of such files requires a lot of machine resources. An even harder problem is to find from these archives data that is needed for solving a specific analysis task in question and load it from the archive to the current analysis environment.

In practice, these event logs are normally filled with repeated entries sharing a lot of structure but still containing some fields whose values are varying. In the example shown in FIG. 1, two repeating event record field value combinations are shown. However, in the middle of all the lines, there is a time field which is changing from line to line.

The log files are typically archived in compressed form. In many cases, compression is done with the well-known Lempel-Ziv compression algorithm (LZ) or with some other corresponding algorithm. When the log files are restored and a query or a regular expression search for relevant lines is made, the whole archive must be decompressed.

An other possibility to archive the logs is to first insert them into a database managed by a database management system and then, after certain period, compress the whole database to a file that is inserted to a tape or another mass storage medium. The problem becomes real when there is a need to analyse old backups. An expert has to find the correct media, decompress the whole database and load it to the database management system. This can be a problem because the size of data included in the database per day might be some gigabytes. Thus its decompression and uploading takes lot of a time. If the compression is not done, the problem is to fit the database to mass storage media and still be able to manage the rapidly grown number of mass storage media. Selecting carefully what is stored can reduce the problem, but still there tends to be quite a lot of data written into archives.

Concepts for obtaining a condensed or concise representation for data mining are known e.g. from J.-F. Boulicaut et al. "Modeling KDD Processes within the Inductive Database Framework", Proceedings of the First International Conference on Data Warehousing and Knowledge Discovery DaWak '99, Florence, Italy, Aug. 30 to Sep. 1, 1999, Springer-Verlag, LNCS 1676, pp. 293-302, "Frequent closures as a concise representation for binary data mining", Proceedings of the 4$^{th}$ Pacific-Asia Conference on Knowledge Discovery and Data Mining PakDD00, Kyoto, Japan, Apr. 18 to 20, 2000, Springer-Verlag LNAI Vol. 1805, pp. 62-73, and "Constraint-based discovery of a condensed representation for frequent patterns", Proceedings of the Workshop Database Support for KDD co-located with the 5$^{th}$ European Conference on Principals and Practice of Knowledge Discovery in Databases PKDD '01, Freiburg, Germany, Sep. 7, 2001, pp. 3-13. In these publications, patterns are used to define association rules which are screened. The aim is to obtain a condensed set of association rules. However, the disclosed procedures do not serve to reduce consumed space or increase readability for human beings.

SUMMARY OF THE INVENTION

It is therefore an object of the present invention to provide a method and apparatus for providing an improved presentation of log record information, which can be applied to all kinds of event logs and which simplifies monitoring and reduces storage requirements.

This object is achieved by a method of compressing a log record information provided to a monitoring system, said method comprising the steps of:
  detecting frequent patterns in said log information; and
  removing redundant frequent patterns whose value or record combination is a subset of a value or record combination of another one of said detected frequent patterns.

Furthermore, the above object is achieved by an apparatus for compressing a log record information provided to a monitoring system, said apparatus comprising:
  detecting means for detecting frequent patterns in said log information; and
  compressing means for removing redundant frequent patterns whose value or record combination is a subset of a value or record combination of another one of said detected frequent patterns.

Accordingly, a general method is provided which can be applied to all event logs arising from communication networks or other monitoring systems. The detection of frequent patterns is only based on value or record combinations and is thus independent of the specific application. Furthermore, due to the removing, of redundant frequent patterns, the method makes it easier for a human observer to focus the log analysis on essential log entries. It removes repeating noise and helps to focus on exceptional and rare processes. Moreover, variation of frequent processes can be observed.

On the other hand, the size of the stored log files can be decreased remarkably while they remain readable for human beings. Thereby, queries made in archives are speeded up, because the number of records that have to be decompressed and scanned through in order to answer a specific information query is reduced.

Specifically, no pre-defined knowledge is required to be continuously maintained while the network infrastructure and applications are evolving. Hence, even previously unknown performance patterns, e.g. slow attacks against network security, can thus be detected.

Furthermore, system processes can be automatically identified and described based on the log record information. Not only volumes of processes but also process dynamics and courses of actions can be analysed in the processes. By separating frequent and infrequent performances, human observers may find and analyse infrequent events properly. Found patterns can be used as a source for defining knowledge for other tools, e.g. for data featuring.

The machine and human understandable presentation of the log record information can be remarkably reduced in size without losing any information. With appropriate querying tools, the compressed file can directly be queried. Thus no decompression is required.

In general, no big processing resources are needed to implement the proposed compression function.

The frequent patterns may correspond to frequently occurring values or value combinations and/or frequently occurring records or record combinations of the log record information. In particular, the values may comprise constant field, set or sequence values of a set of the log record information. Furthermore, the records may comprise frequent line sequences of the log record information.

The detection step may comprise counting occurrences of patterns, and comparing the counting result with a predetermined threshold. The removing step may be used to create a condensed representation of the log record information. Particularly, the creation of this condensed representation may comprise the steps of ordering the detected frequent patterns to a linear order where a superset precedes its subsets until no more detected frequent patterns are left, and removing all frequent patterns that are subsets of the first pattern and which occur in said log record information when said first pattern does. The removing step of the creation may further comprise the step of decreasing a support information allocated to a subset of the first pattern if the subset also occurs in the log record information when the first pattern does not, by a support information allocated to the first pattern, and removing the subset if its support information becomes zero. Every line of data may be considered only once in the subtraction.

An adequate information of the log record information may be created by removing or marking lines or line combinations which support the detected frequent patterns, and adding the condensed representation. Alternatively, the adequate information may be created by linking the detected and compressed frequent patterns to the log record information. As a further alternative, the adequate information may be created by constructing an inclusion hierarchy of the detected and compressed frequent patterns, and ordering the detected and compressed frequent patterns using an estimation function. As an even further alternative, the adequate information may be created by extracting association or episode rules and linking the inclusion hierarchy of the detected and compressed frequent patterns to the extracted rules.

The detection step may be restricted by setting constraints on any field or field combinations. These constraints can be e.g. distance measures like distance in time or distance in network topology, or Boolean constraints like accordance to a predetermined regular expression.

According to another advantageous further development, the removing step may be used to create a condensed directory structure for separating and coding the log record information in order to be stored in a log file. Then, a query may be first applied to the detected and compressed frequent patterns and then to unmatched portions of the log files. Specifically, all lines of a specific pattern may be returned if the answer to the query contains values of the specific pattern.

The reduced lines of the log file may be grouped by the detected and compressed frequent patterns. Alternatively, a pattern identification may be added to lines of the log files, from which fields already included in the detected and compressed frequent patterns have been removed.

Furthermore, a regular expression may be attached to each of the detected and compressed frequent patterns, the regular expression matching only to those lines of the log file where the values included in the corresponding pattern are present. Then, the removing step may comprise the steps of reading a file header of the log file, removing constant values from each line, removing all values included in a detected and compressed frequent pattern from a line and adding the line to a list of lines matched by the pattern, if the regular expression of the pattern matches to the line, and adding remaining lines of the log file to a list of unmatched lines. The lists of matched lines and unmatched lines can be appended to individual printouts of lines. Additionally, markup language tags, e.g. XML tags, may be added to the log file.

The compression procedure according to the present invention may be implemented as a computer program product adapted to perform the above functions when being loaded to a computer or other data processing system. In particular, the computer program product may be downloadable from a data network or may provided on a record carrier, e.g. a disc, card, magnetic tape or other external storing medium.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 2:
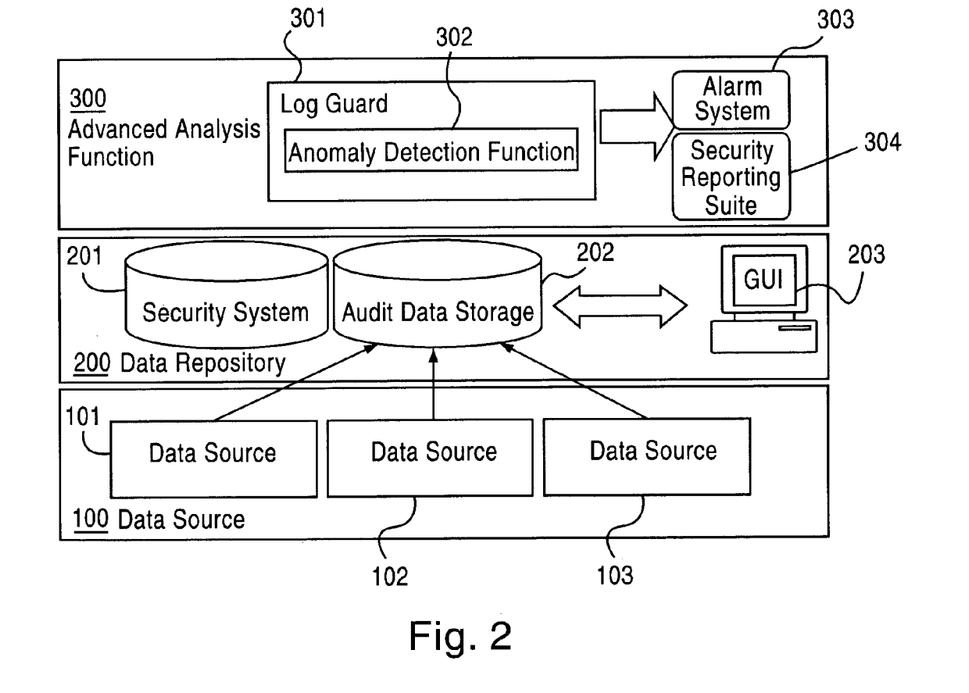
FIG. 2 shows a schematic architecture of a security monitoring system in which the present invention can be implemented.

The first and second preferred embodiments will now be described on the basis of a security monitoring system as shown in FIG. 2.

FIG. 2 shows a security monitoring structure for monitoring a communication network or own processes of a network operator based on event logs in addition to event counters, wherein data records are collected in log data files. In particular, the structure consists of data sources 100 which may consist of information gathering network activity probes of a log manager, and which could be file system integrity system scanners or file system integrity checking agents, programs, systems, modules or the like, network probes of logging functions of a data communication network equipment, a firewall or a gateway of a Virtual Private Network (VPN), or network element probes of a user activity logging function, a file system integrity function, or a system scanner function. The data records obtained from the data sources 100 are supplied to data repositories 200 comprising independent security systems 201 and an audit data storage 202 which can be browsed by a Graphical User Interface (GUI) 203 operated by maintenance personal. Furthermore, the data collected in the audit data storage 202 is supplied to an advanced analysis function 300 for security monitoring. In particular, the advanced analysis functionality 300 comprises a log guard 301 having an anomaly detection function 302 and arranged to control an alarm system 303 and a security reporting suite 304. In particular, the log data is analysed by the log guard unit 301 and the security reporting suite 304. In the log guard unit 301 the log data is formatted, integrity checked, classified, and anomalies are detected. Then, the processed log data is supplied to the security reporting suite 304 where the processed log data is linked, filtered and processed to provide an adequate information for the GUI 203 so as to facilitate and enhance the reliability of the monitoring system. This reporting could be carried out either directly (not shown in FIG. 2) or via the audit data storage 202.

According to the preferred embodiment, a compressing method is provided, by means of which log data from a large log file can be identified without prior knowledge of any used identifiers in order to separate frequently occurring patterns in such a way that it is possible to separate and filter out events and event sequences that occur so frequently that they scatter and hide less often re-occurring but important details in the log entries. Thereby, unique or infrequent events and event sequences stand out from the mass of less important log entries, which helps to identify and understand their relationship. In particular, patterns are used for parsing and forming the data to be more readable and less space consuming.

According to the first preferred embodiment, a representation of the log data is created, which forms a directory structure to the data by using predetermined algorithms in order to find frequently occurring patterns from large event data files. This directory structure makes it possible to separate and filter out events and event sequences that occur so frequently in the log file that they are hiding other, unique or only few times occurring events in their huge mass. Thereby, a human observer is enabled to perceive frequently repeating processes as well as exceptions and other not so frequent details in the log file. This is possible without requiring any pre-defined patterns or value combinations. Thus, the present invention overcomes the problem of masses by identifying and separating frequently occurring event records and chains of them. These patterns are described by showing how they look like, how they vary and when they have been inserted to the log file, for a human observer. As soon as these continuously repeating events and event chains have been removed from the core log file, a human expert is free to concentrate on the structure of the frequent processes as well as to recognize and analyse log details and their mutual relations.

For example, in a log data file of a small firewall there can be 15,000 rows per day. From this log file it is possible to identify 5 frequently repeating line types that are not interesting at all. These lines make up 89.6% of the whole log file.

When they have been removed, there will be only about 220 lines left in the log file. Then, it is quite an easy task to show and describe these lines in such way that they can be analysed by a human observer.

In particular, according to the preferred embodiment, frequent sets and episodes are searched for. The required search algorithms can be gathered e.g. from H. Mannila, et al. "Efficient algorithms for discovering association rules", Knowledge Discovery in Databases (KDD '94), AAAI Press 1994, pp. 181-192, "Discovering Frequent Episodes in Sequences", First International Conference on Knowledge Discovery and Data Mining (KDD '95), pp. 210-215, AAAI Press 1995, and "Discovery of frequent episodes in event sequences", Data Mining and Knowledge Discovery, pp. 259-289, 1997. In contrast to the approaches described in the above publications, the found frequent sets and episodes are identified, removed or marked, and described from one log file, so as to decrease analysis load for human observers.

Figure 3:
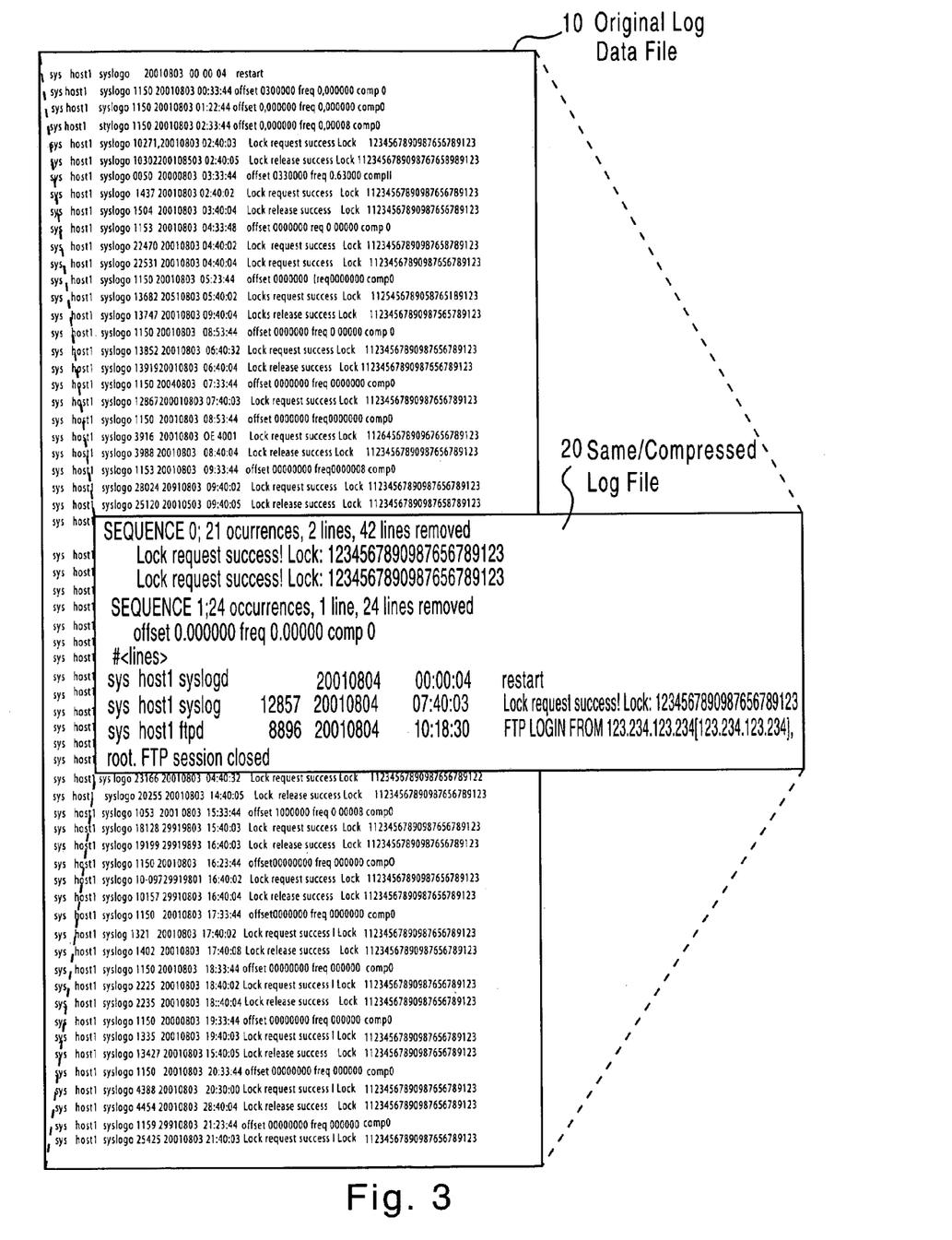
FIG. 3 shows an example of a compression of a system logging feature of a computer system.

FIG. 3 shows an example with an original log data file 10 and the same log file 20 after searching for frequent line sequences and their removal. In particular, two patterns of line (SEQUENCE 0, SEQUENCE 1) were found which occur throughout the day. When those have been removed, the file transfer protocol (FTP) log entry which was recorded in the middle of the day becomes clearly visible, as indicated in the remaining log lines shown in the lower part of the compressed log 20.

The frequent patterns identified by the detection algorithm can be either frequent sets, i.e. frequently occurring value combinations from log records, or frequent episodes, i.e. frequently occurring record combinations in the log records.

Figure 4:
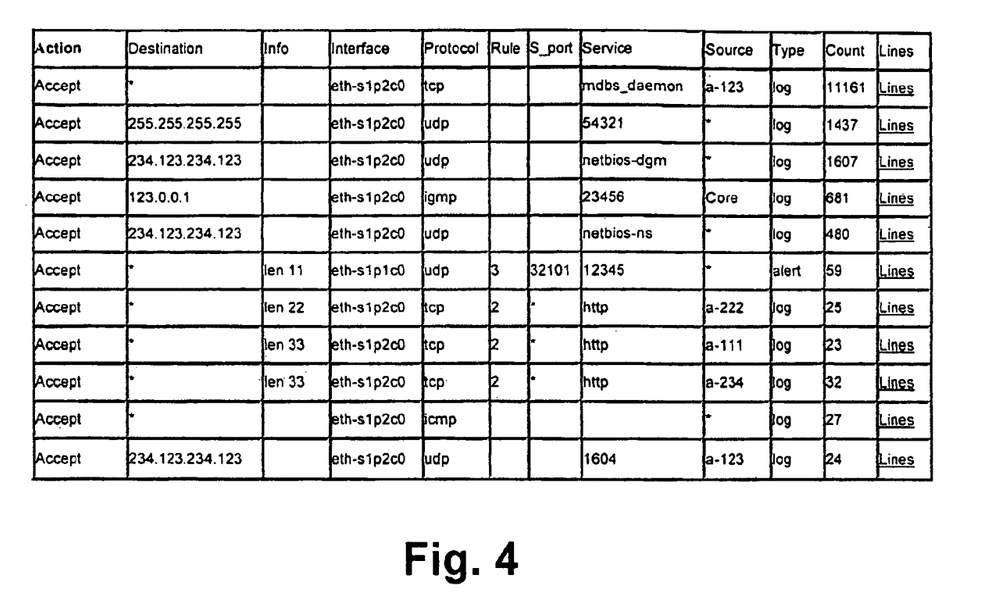
FIG. 4 shows a table of most frequent patterns obtained from a firewall log.

FIG. 4 shows an example for eleven most frequent sets or patterns found in a firewall log file. The first set contains constant values of all other fields except the field "destination". Therefore, this field is marked with "*". Furthermore, the next two lines consist of constant values of all other fields except the field "source", and so on. Correspondingly, in the example shown in FIG. 3, the detection algorithm has identified two frequent episodes, wherein the first sequence 0 consists of two lines and the other sequence 1 contains only one line. Due to the repeated occurrences of these two sequences SEQUENCE 0 and SEQUENCE 1, 66 lines can be removed from the system log data file. In the example shown in FIG. 4, all lines of the log file matching to one of the eleven frequent patterns can be removed from the core log or alternatively lines of a pattern and their predecessors or successors can be inspected in the log file. The lines matching one of these patterns cover about 99.8% of the whole log file. After these have been removed there will only 31 lines left in the log file.

Figure 5:
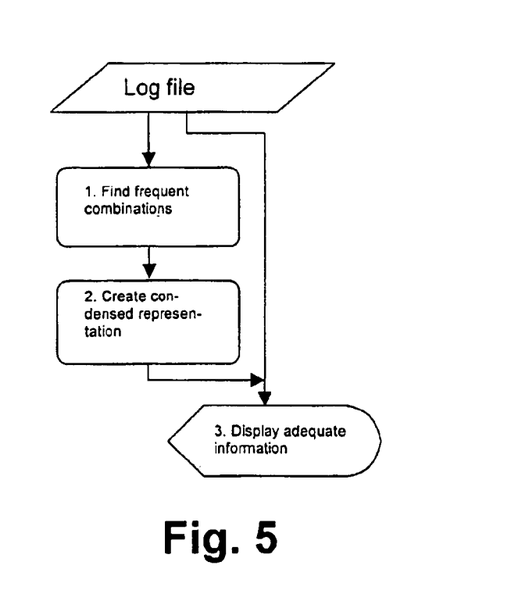
FIG. 5 shows a schematic flow diagram of a log compression procedure according to a first preferred embodiment.

FIG. 5 shows a schematic flow diagram indicating a filtering or compression algorithm for obtaining a comprehensive or condensed log file so as to display an adequate information to a human observer. In a first step, frequent combinations or patterns are detected. Then, in a second step, a condensed representation is created in order to display an adequate information in a third step.

In the first step, the log file is analysed and frequently occurring items are identified. This procedure is based on a counting function for counting item occurrences. If an item occurs in the log file more frequently than a predetermined threshold, it is considered a frequent item or pattern. Several possible algorithms for finding frequent patterns, e.g. sets and episodes, are given in the above references. All the solutions given in these articles concentrate on finding association rules or episode rules. The comprehensive log compression algorithm used in the preferred embodiments takes advantage of the first phase of those algorithms, i.e. finding frequent sets or episodes. In particular, those patterns are used to find and mark frequent item combinations in the log file.

In the second step, the algorithm inspects the set of found frequent patterns in order to remove these frequent patterns which do not provide any additional information about the combinations inside the log file.

Frequent patterns just repeat the information that is already available in more detail patterns. In particular, the algorithm is adapted to remove patterns whose value combinations are subsets of value combinations of another pattern, called a superset, and which occur in the data only when the value set of the superset occurs.

Figure 6:
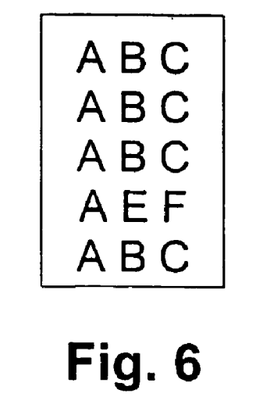
FIG. 6 shows an explanatory example of a small log file.

FIG. 6 shows an exemplary small log file with 5 rows. This log file contains only two types of lines in the data, i.e. a line "A B C" which occurs four times and a line "A E F" which occurs once. Thus, if the threshold for a frequent set has been set to "2", there are frequent sets {(A)(B)(C)(A,B)(A,C)(B,C)(A,B,C)}. From these frequent sets, the algorithm removes the sets {(B)(C)(A,B)(A,C)(B,C)} as they are subsets of the superset (A,B,C) and occur in the data always together with this superset.

As an alternative, largest possible frequent sets may be searched by counting e.g. unique lines in the data and simultaneously smallest possible frequent sets, and then start to stepwise generate one item smaller frequent sets for the large sets and one item larger item sets for the small sets. When the support for a large set matches to a support of any small item set included in the large one, it can be stopped to develop small item sets further. Correspondingly, if there is a small item set which support to the support of a large item set, for each item included in the large item set, it can be stopped to develop the large item set further. Thereby, all item sets containing additional information can be found without removing anything from the set of item sets. For example, with the data in FIG. 6 with one additional line namely "A B D" let frequency threshold be "1". Unique lines with support (ABC, 4), (AEF, 1), (ABD, 1). These are also the largest possible frequent sets. Smallest possible candidates are (A, 6), (B, 5), (C, 4), (D, 1), (E, 1), (F, 1). Thus, "C" can be left out, since its support equals to that of "ABC" and correspondingly "D", "E", and "F" are not remarkable. There are left "A" and "B" which will be combined to "AB" with support "5" and "A" and "B" can be removed. Thus, there are the following meaningful frequent sets {(AB, 5) (ABC, 4) (ABD, 1.) (AEF, 1 )} which is the condensed representation of the whole data set and the compression result could be:

"ABC": lines 0-2, 4; "AB": line 5; unmatched: line 3 "AEF", line 5 "D"

Figure 8:
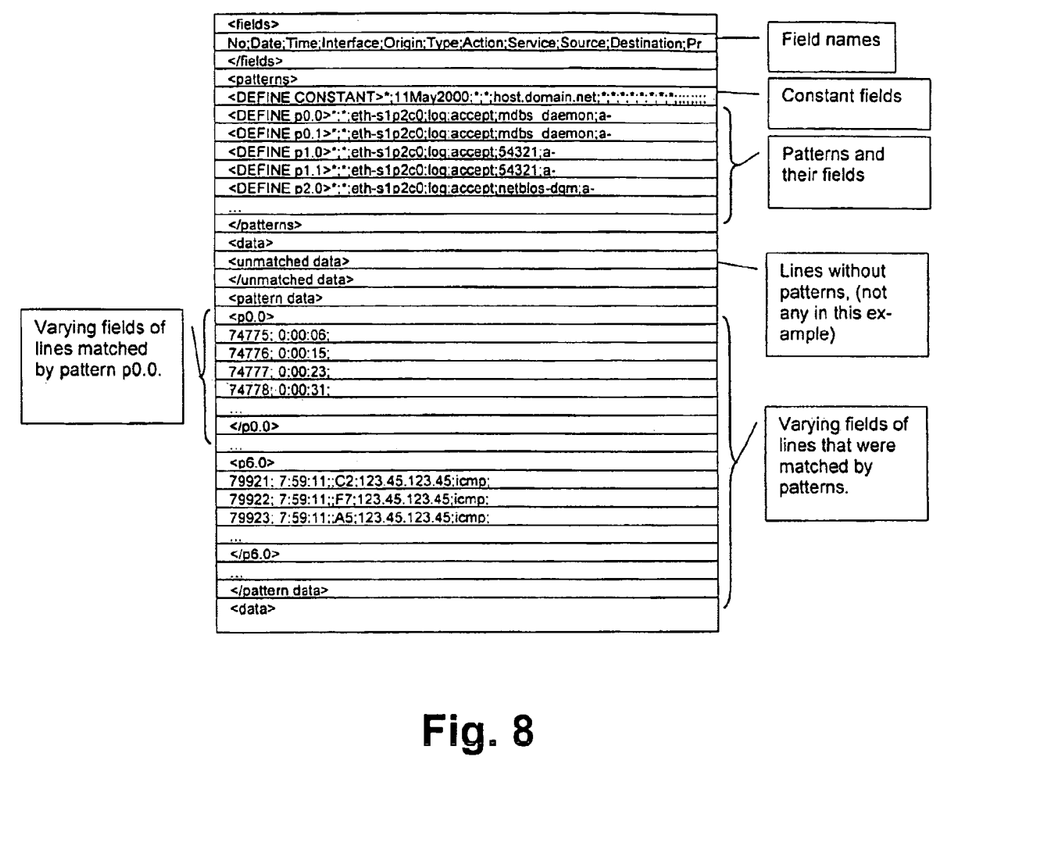
FIG. 8 shows an example of a compressed log file according to the second preferred embodiment.

If the data contains fields that are known to contain unique values like record numbers, time, process numbers or the like, these fields can be removed from the analysis. This requires pre-knowledge about the data but can improve the efficiency of the algorithm. For example, in FIG. 1, there are a record number and time fields that can be left out of the analysis, but might be included in the results, which is shown in FIG. 8.

For the creation of a condensed representation the following simple algorithm can be used:
1. Order the inclusion graph of all the frequent patterns to a linear order where a superset precedes its subsets;
2. Loop until there are no more patterns left;
   2.1. Remove all frequent patterns which are subset of the first pattern and which occur in the log data exactly when the first pattern does;
   2.2. Decrease a support information of such subsets of the first pattern, which occur in the log data also when the first pattern does not, by the support information of the first pattern (while every line of data is considered only once in the subtraction);

2.3. Remove a pattern when a support information of the pattern becomes zero;

2.4. Take next pattern from the set of remaining patterns

3. Report the pruned inclusion graph.

In the third step, the original log file and the condensed set of frequent patterns are used as input information. Then, the display function can be arranged to remove all lines or line combinations supporting frequent patterns from the log file and display the condensed pattern set and the pruned log file, as indicated in FIG. 3.

As an alternative, the display function in the third step may be arranged to maintain the log file as it is and link the frequent patterns to the log file so that it is possible to find and inspect supporting lines and statistics derived from them. This is the case in the firewall log example shown in FIG. 4.

As a further alternative, the display function in the third step may be adapted to construct an inclusion hierarchy of frequent patterns and use this hierarchy together with some significance estimation function to order the patterns and display them to the user.

Finally, the third step may be arranged to extract association or episode rules and link the inclusion hierarchy of patterns to them so that a directory to a set of rules is created.

As can be seen from the above mentioned publications by Boulicaut et al, other algorithms described there may be used as well to create a condensed representation. Even the described close inclusions, e.g. delta or epsilon representations, may be used in the proposed compression, e.g. for monitoring applications, if a loss of information is acceptable.

In practice, the above algorithms can be implemented in any programming language, e.g. Perl, C++ or Java. For example, there may be two parameters required for finding frequent patterns and three parameters for finding frequent episodes. In particular, the parameters relate to a threshold for a frequent value, a threshold for a frequent pattern, and constraints for valid episodes and patterns like time limits etc. The accuracy of finding frequent sequences might be improved by setting additional other restrictions for the records, which have to be met in order to support a frequent sequence. E.g., such a restriction may be the fact that the records must have been emitted by the same network element. These additional restrictions must be provided as a parameter or in a configuration file.

According to the second preferred embodiment, the directory structure created by detecting frequently occurring patterns from large log files is used to separate and code events and value combinations included in the log files or data records. This coding reduces the size of the stored log file radically. In particular, the coding doesn't lose any information and the original log file can easily be restored. Thus, In the present second preferred embodiment, the obtained information is used for compressing the log file for long term storage. For example, in a log data file of a small firewall there can be 15,000 rows per day. From this log it is possible to identify 26 frequently repeating text string combinations that cover all the lines in the log file. These string patterns can be removed from the log file and stored to the header of the file. Thus, the file size decreases by 84% although descriptive and structuring markup language e.g. XML tags are included. The resulting log file is still fully understandable for a human observer. Furthermore, the original file can easily be reconstructed from the compressed log. file, because no information of the original file has been lost.

Accordingly, the second preferred embodiment enables an optimization of query mechanisms by reducing the number of lines to which a query or regular expression has to be applied during the search for an answer. This is possible due to the fact that the header including all the patterns, also includes the most frequently occurring values. When a query for the lines that contain a value which fulfils a given search criteria Is computed, it is in the most cases sufficient to query only the patterns and all the lines that were not covered by any pattern.

The detection algorithm for detecting frequent patterns may also be derived from the above publications. In particular, the detection algorithm is used to identify and replace frequently repeating text strings from one log file with one instance of the found string combination and to decrease the space needed for storing the log file.

Figure 7:
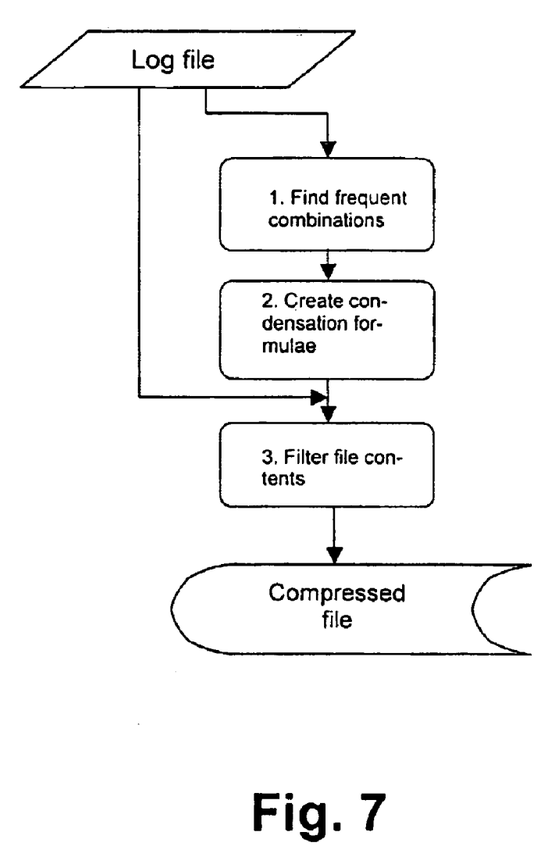
FIG. 7 shows a schematic flow diagram of a log file compression procedure according to a second preferred embodiment.

FIG. 7 shows a basic flow diagram indicating an algorithm for a frequent pattern compression of a log fife. In particular, frequent combinations are detected in a first step, and at least one condensed formula is created in a second step. This at least one condensed formula is used together with the log file in a third step to filter file contents in order to generate the compressed log file.

In the first step, the log file is analysed and frequently occurring items are identified. Similar to the first preferred embodiment, this is based on a counting of item occurrences. If an item occurs in the data of the log file more frequently than a given threshold, it is considered a frequent item or pattern. Then, the algorithm uses those frequent patterns to find and, mark frequent item combinations in the log file.

In the second step, a condensed representation of the data of the log file is created in the creation of the condensation formulae. This may be achieved in the same way as explained in the first preferred embodiment in connection with the example shown in FIG. 6.

When the condensed representation has been created, it is used to create regular expressions for the patterns. A regular expression matching only to those lines where the values included in the pattern are present, is attached to each pattern.

In the third step, the algorithm inspects the original log file and removes all redundancies which have been identified. In particular, the algorithm receives the original log file and the condensation formulae as input. The algorithm may also insert XML tags to clarify the structure of the output file. In particular, the algorithm performs the following steps:

1. Read file header;
2. For each line I do
    2.1. Remove all constant values from line I;
    2.2. For each pattern p do
        2.2.1. If the regular expression of the pattern p matches to line I then
            2.2.1.1. Remove all values included in the pattern p from the line I;
            2.2.1.2. Include the line I to a list of lines matched by pattern p;
            2.2.1.3. Get the next line I;
    2.3. endfor
    2.4. Include line I to a list of unmatched lines;
3. endfor
4. output any combination of elements, e.g fields, constants, patterns, unmatched lines, lines attached to each pattern.

The lists obtained for each pattern and the list of unmatched lines don't have to be stored in the main memory. They can be arranged as files appended every time a line is printed.

FIG. 8 shows an example of a compressed log file. Values marked with "*" can vary arbitrarily. Three succeeding dots are used to mark text that has been removed for presentation purposes. In particular, a compressed firewall log file is shown, wherein 9 constant fields and 26 patterns have been found, from which the 5 most often occurring ones are shown. The compressed representation comprises 4 essential elements: list of fields, pattern of constants on rows, list of patterns and list of rows (or their remaining parts) matched to any of the patterns (including no pattern) In the pattern representation, any value can be included in a field marked with "*". The compression rate was 84%. An alternative presentation for the lines matched by patterns would be to include the pattern tag at the beginning of a line. This would consume more space and would be less effective for queries, but preserves the original order of the lines in the log file.

However, the size reduction of the compressed log files is not the only benefit obtained from the compression algorithm. Another benefit is the optimization of queries. The patterns themselves include most of the volume of the data. Any query that is made can be first applied to the patterns and—if there are any—to the unmatched rows that were left of the original file. If the query includes a reference to a field not included in all patterns, then the query can be applied to the lines of those patterns that did not contain the field in question. If the answer to the query contains values of a pattern, all lines of this specific pattern might be returned. It might as well be sufficient to return the pattern attached with the information about the number of lines from which it is derived.

For example, if a user makes a query, e.g. "select source where service eq mbds_daemon", in order to select an entry where the field "service" equals to "mbds_daemon", it would be enough to inspect the constant row, all the pattern definitions, unmatched rows and rows that match to those patterns which do not contain a value for the field "service". These include, for example, the pattern p6.0. All together there would be 106 lines to be inspected. After inspecting these patterns and lines, the system could return "a-123" as an answer. In the conventional case, if the data is not indexed on this field, the query would have to go through the whole log file with more than 15,000 lines. To minimize the amount of the possible needed decompression with LZ algorithm, lines attached to patterns which include fewer fields can be added to the beginning of the compressed log file.

Figure 12:
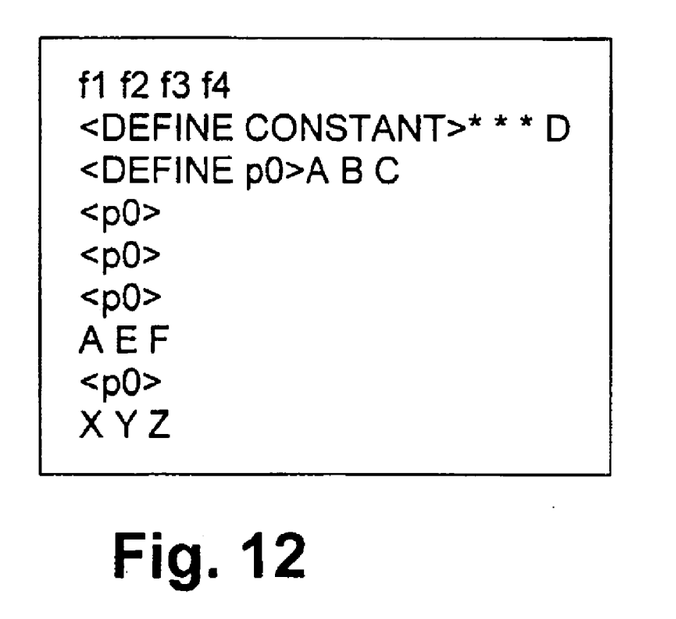
FIG. 12 shows an explanatory log file in alternative compressed format.

Furthermore, instead of grouping reduced lines by patterns, the pattern identification can be added to the lines from which all the fields already included in the pattern have been removed, as indicated in FIG. 12.

As a further alternative, an index or inverted structure from patterns to corresponding lines can be generated while patterns are searched for. Thereby, data may be compressed to a certain extent.

Figure 9:
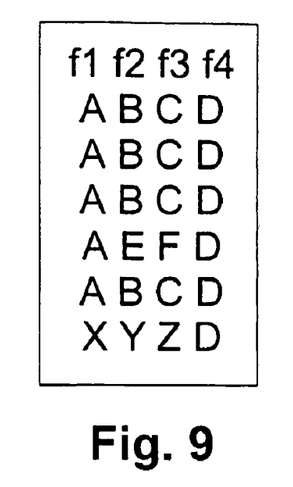
FIG. 9 shows an explanatory log file.
Figure 10:
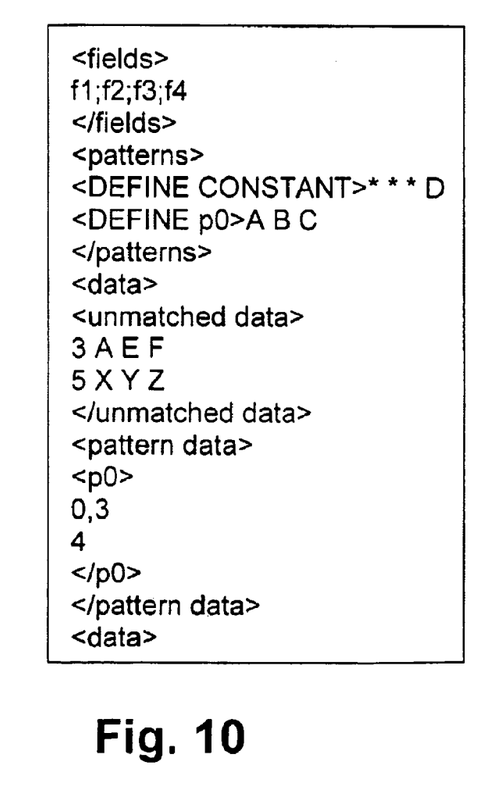
FIG. 10 shows an explanatory log file with XML tagged format.

FIG. 9 shows an example of a small log file with 4 columns and 6 data rows. The output of the compression algorithm for this log file is shown in FIG. 10 as a log file in XML tagged compressed format. In the case shown in FIG. 10, no unique key fields are used-to order the lines included in the data rows. Therefore, line numbers are attached by the algorithm. The reason for this is the requirement that the order of lines needs to be maintained. However, there may be cases where this is not required or where the order is presented by any key combination. However, most of the XML tags added in the example of FIG. 10 are not required for the compression. They are just used to make the log file more understandable for a human observer.

Figure 11:
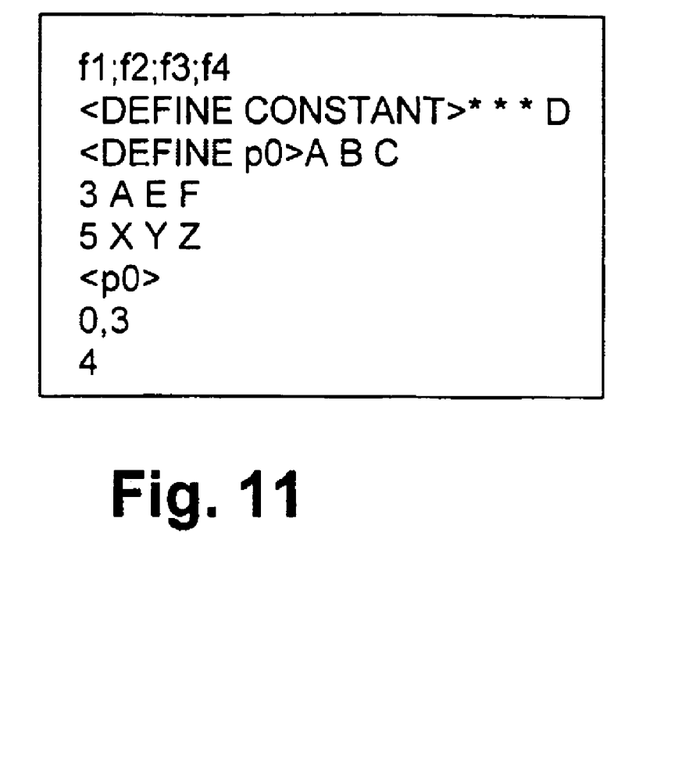
FIG. 11 shows an explanatory log file in compressed format without additional XML tags.

FIG. 11 shows a corresponding log file in compressed format without the additional XML tags.

An alternative file format is shown in FIG. 12. This format is advantageous in cases where queries must be optimized for finding ordered sequences of log rows which are matched by different patterns.

Which one of the above possible formats is used depends on the form and contents of the original log file which is compressed and the intended use of the file.

The proposed compression tool according to the second preferred embodiment is easy to implement and can handle all formats transparently. Furthermore, an additional type identifier can be used in the file header to inform the decompression tool about how the file structure is organized. Command line options, e.g. flags, can control the file format to be used.

Also in the second preferred embodiment, the algorithms can be implemented in any programming language, e.g. Perl, C++, Java. In the present second embodiment, one parameter is required for finding frequent sets, i.e. a threshold for a frequent value.

It is noted that the present invention can be used in any monitoring system for compressing any log record information in which frequent patterns may occur. The application domain of the proposed compression function is not restricted and can be applied to all event logs as well as other logs and data files having similar structure. For example, in same classical association rule applications, so-called transaction data is discussed, which is data structured to separate transactions each of which contain a sequence or set of items, e.g. market basket data containing separate receipts of bought items, or a server log of web or wap sessions containing an ordered list of visited pages. The above described procedures according to the preferred embodiments are also applicable when taking into account the structure of such data. This can be achieved by replacing log lines with transactions and searching for frequent patterns in the set of transactions (e.g. computer or web sessions or the like). Then, a log file with original rows A,B,C; A,B,C,D; A,B; A,D,E,F; A,B,C could be compressed to <p1>; <p1>D; <p0>; A,D,E,F; <p1>, wherein <p0>=A,B and <p1>=A,B,C. It can be used in any database management systems archiving old data. The preferred embodiments may thus vary within the scope of the attached claims.

The invention claimed is:

1. A method, comprising:
   finding, by a processor, redundant frequent patterns having a value or a record combination that is a subset of a value or record combination of a larger one of a plurality of detected frequent patterns in log record information;
   removing, by the processor, said redundant frequent patterns having the value or the record combination that is the subset of the value or the record combination of said larger one of said detected frequent patterns from the found redundant frequent patterns while maintaining said larger one of said detected frequent patterns; and
   compressing said log record information after removing said redundant frequent patterns having the value or the record combination that is the subset of the value or the record combination of said larger one of said detected frequent patterns using the remaining found redundant frequent patterns.

2. The method according to claim 1, wherein said frequent patterns correspond to one or more of frequently occurring values and frequently occurring records of said log record information.

3. The method according to claim 2, wherein said values comprise constant field, set or sequence values of a set of said log record information.

4. The method according to claim 2, wherein said records comprise frequent line sequences of said log record information.

5. The method according to claim 1, wherein said detecting comprises counting occurrences of patterns, and comparing the counting result with a predetermined threshold.

6. The method according to claim 1, wherein said removing of redundant frequent patterns comprises creating a condensed representation of said log record information.

7. The method according to claim 6, wherein said creating comprises:
   ordering said detected frequent patterns into a linear order, wherein a superset precedes its subsets until no more detected frequent patterns are left; and
   removing all frequent patterns that are subsets of the first pattern and that occur in said log record information when said first pattern occurs.

8. The method according to claim 7, wherein said removing of all frequent patterns comprises decreasing support information allocated to a subset of said first pattern when said subset also occurs in said log record information when said first pattern does not occur by support information allocated to said first pattern, and by removing said subset when the support information becomes zero.

9. The method according to claim 6, further comprising:
   creating adequate information of said log record information by removing or marking lines or line combinations that support said detected frequent patterns, and by adding said condensed representation.

10. The method according to claim 6, further comprising:
    creating an adequate information log by linking said detected and compressed frequent patterns to said log record information.

11. The method according to claim 6, further comprising:
    creating adequate information by constructing an inclusion hierarchy of said detected and compressed frequent patterns, and by ordering said detected and compressed frequent patterns using an estimation function.

12. The method according to claim 6, further comprising:
    creating adequate information by extracting association or episode rules and linking an inclusion hierarchy of said detected and compressed frequent patterns to said extracted rules.

13. The method according to claim 1, further comprising:
    restricting said detection by setting constraints on predetermined field or field combinations of said log record information.

14. The method according to claim 1, wherein said removing of redundant frequent patterns comprises creating a condensed directory structure to separate and code said log record information in order to be stored in a log file.

15. The method according to claim 14, further comprising:
    applying a query, first to said detected and compressed frequent patterns, and then to unmatched portions of said log file.

16. The method according to claim 15, further comprising:
    returning all lines of a pattern when said pattern matches with said query.

17. The method according to claim 14, further comprising:
    grouping reduced lines of said log file by said detected and said compressed frequent patterns.

18. The method according to claim 14, further comprising:
    adding a pattern identification to lines of said log file, from which fields already included in said detected and said compressed frequent patterns have been removed.

19. The method according to claim 14, further comprising:
    attaching a regular expression or a query to each of said detected and said compressed frequent patterns, wherein said regular expression matches only to the lines of said log file where the values included in the corresponding pattern are present.

20. The method according to claim 19, wherein said removing of redundant frequent patterns comprises:
    reading a file header of said log file;
    removing constant values from each line of said log file;
    when said regular expression of a detected and compressed frequent pattern matches to a line, removing all values included in said pattern from said line and adding said line to a list of lines matched by said pattern; and
    adding remaining lines of said log file to a list of unmatched lines.

21. The method according to claim 19, further comprising:
    appending said lists of matched lines and unmatched lines to individual printouts of the lines.

22. The method according to claim 14, further comprising:
    adding markup language tags to said log file.

23. The method according to claim 1, further comprising:
    providing said log record information to a monitoring system.

24. An apparatus, comprising:
    a processor configured to
        find redundant frequent patterns having a value or a record combination that is a subset of a value or a record combination of a larger one of a plurality of detected frequent patterns in log record information;
        remove the redundant frequent patterns having the value or the record combination that is the subset of the value or the record combination of said larger one of said detected frequent patterns from the found redundant frequent patterns while maintaining said larger one of said detected frequent patterns; and
        compress said log record information after removing said redundant frequent patterns having the value or the record combination that is the subset of the value or the record combination of said larger one of said detected frequent patterns using the remaining found redundant frequent patterns.

25. The apparatus according to claim 24, wherein said processor is configured to create a condensed representation of said log record information.

26. The apparatus according to claim 24, wherein said processor is configured to create a condensed directory structure to separate and code said log record information in order to be stored in a log file.

27. The apparatus according to claim 24, wherein said processor is configured to provide said log record information to a monitoring system.

28. A computer program embodied on a computer readable storage medium, the computer program configured to control a processor to perform a process, the process comprising:
    finding redundant frequent patterns having a value or a record combination that is a subset of a value or record combination of a larger one of a plurality of detected frequent patterns in log record information;
    removing the redundant frequent patterns having the value or the record combination that is the subset of the value or the record combination of said larger one of said detected frequent patterns from the found redundant frequents patterns while maintaining said lager one of said detected frequent patterns; and
    compressing said log record information after removing said redundant frequent patterns having the value or the record combination that is the subset of the value or the record combination of said larger one of said detected frequent patterns using the remaining found redundant frequent patterns.

29. An apparatus, comprising:

finding means for finding redundant frequent patterns having a value or a record combination that is a subset of a value or record combination of a larger one of a plurality of detected frequent patterns in log record information;

removing means for removing the redundant frequent patterns having the value or the record combination that is the subset of the value or the record combination of said larger one of said detected frequent patterns from the found redundant frequent patterns while maintaining said larger one of said detected frequent patterns; and compressing means for compressing said log record information after removing said redundant frequent patterns having the value or the record combination that is the subset of the value or the record combination of said larger one of said detected frequent patterns using the remaining found redundant frequent patterns.

* * * * *